(12) United States Patent
Hwang et al.

(10) Patent No.: US 7,755,988 B2
(45) Date of Patent: Jul. 13, 2010

(54) INFORMATION RECORDING MEDIUM, RECORDING/REPRODUCING APPARATUS AND RECORDING/REPRODUCING METHOD

(75) Inventors: Sung-hee Hwang, Suwon-si (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1283 days.

(21) Appl. No.: 11/193,405

(22) Filed: Aug. 1, 2005

(65) Prior Publication Data
US 2006/0022849 A1 Feb. 2, 2006

(30) Foreign Application Priority Data
Aug. 2, 2004 (KR) .................. 10-2004-0060916

(51) Int. Cl.
*G11B 7/00* (2006.01)
(52) U.S. Cl. .............. 369/47.14; 369/53.15; 369/53.17; 714/710; 714/718
(58) Field of Classification Search ............... 369/47.1, 369/53.15, 47.14, 53.17; 710/710, 718
See application file for complete search history.

(56) References Cited

U.S. PATENT DOCUMENTS

| | | | |
|---|---|---|---|
| 6,160,778 A | 12/2000 | Ito et al. | |
| 6,292,445 B1 | 9/2001 | Ito et al. | |
| 6,385,148 B2 * | 5/2002 | Ito et al. | 369/47.14 |
| 6,606,285 B1 * | 8/2003 | Ijtsma et al. | 369/47.1 |
| 7,596,063 B2 * | 9/2009 | Sasaki | 369/47.14 |
| 2001/0026511 A1 * | 10/2001 | Ueda et al. | 369/47.14 |
| 2004/0004917 A1 * | 1/2004 | Lee | 369/47.14 |
| 2004/0120233 A1 * | 6/2004 | Park et al. | 369/47.13 |
| 2008/0279073 A1 * | 11/2008 | Gotoh et al. | 369/53.17 |

FOREIGN PATENT DOCUMENTS

CN 1338103 A 2/2002

(Continued)

OTHER PUBLICATIONS

Search Report issued in International Patent Application No. PCT/KR2005/002500 on Oct. 31, 2005.

(Continued)

*Primary Examiner*—Wayne R Young
*Assistant Examiner*—Linh T Nguyen
(74) *Attorney, Agent, or Firm*—NSIP Law

(57) ABSTRACT

An information recording medium, a recording and/or reproducing apparatus and a recording and/or reproducing method are provided. The recording apparatus includes: a write/read unit for recording data on an information storage medium in which a user data area for writing user data and a spare area for replacing a defect occurring in the user data area are disposed, and a replacement recording block to replace an original recording block recorded in the user data area is recorded in a non-recorded area of the spare area or the user data area; and a control unit for controlling the write/read unit so that a replacement entry indicating that part of the recording block is replaced is recorded on the storage medium. As a result, data reproduction time can be advantageously reduced so as to improve system performance, particularly, in a system where data replacement by logical overwrite (LOW) is implemented both in a user data area and a spare area, or in a system performing defect management.

19 Claims, 9 Drawing Sheets

FOREIGN PATENT DOCUMENTS

| | | |
|---|---|---|
| EP | 1132914 | 9/2001 |
| EP | 1365404 | 11/2003 |
| JP | 2000-322835 | 11/2000 |
| JP | 2001-176204 | 6/2001 |
| JP | 2002-025198 | 1/2002 |
| JP | P2005-293779 A | 10/2005 |
| JP | P2005-293780 A | 10/2005 |

OTHER PUBLICATIONS

Office Action dated Apr. 3, 2009 of the Chinese Patent Application No. 200580025285.3.

Office Action issued from the Japanese Patent Office, dated Aug. 11, 2009, in Japanese Patent Application No. 524739.

Japanese Office Action issued on Jan. 19, 2010, in corresponding Japanese Application No. 2007-524739 (4 pages).

* cited by examiner

INFORMATION RECORDING MEDIUM, RECORDING/REPRODUCING APPARATUS AND RECORDING/REPRODUCING METHOD

CROSS-REFERENCE TO RELATED APPLICATIONS

This application claims all benefits accruing under 35 U.S.C. §119 of Korean Patent Application No. 10-2004-0060916, filed on Aug. 2, 2004, in the Korean Intellectual Property Office, the disclosure of which is incorporated herein in its entirety by reference.

BACKGROUND OF THE INVENTION

1. Field of the Invention

The present invention relates to information storage media, and more particularly, to an information storage medium such as an optical disc supporting partial data replacement, a recording and/or reproducing apparatus and a recording and/or reproducing method.

2. Related Art

In general, a rewritable information storage medium contains a data area for storing data and management areas for storing information for data management. The data area is provided with a user data area for storing user data and at least one spare area for defect management. When user data is recorded in the user data area (an area in the data area that excludes the spare area), or when user data recorded in the user data area is reproduced and a defect is generated, replacement data to replace the defect data is recorded in the spare area.

In case of a write-once information storage medium, this defect management technique is used in connection with logical overwrite (LOW). Logical overwrite (LOW) is known as a method by which the write-once information storage medium can be used in the same manner as a rewritable information storage medium. That is, in order to update data already recorded in a user data area, the recorded data can be treated as if it is defect data, and data to replace this recorded data (which is treated as "defect data") is recorded in a spare area. Thus, while the logical address of the data recorded in the user data area is fixed, the address of the data recorded in the spare area can be used as the physical address corresponding to the logical address. By doing so, a host can see data in the user data area as if only rewriting of the data is performed at the identical location, and therefore data management can be made easier and more effective. This is because the host uses only the logical addresses of data. However, the area used for recording replacement (update) date is limited to the spare area.

More recently, a new method which implements LOW for defect management is utilized to maximize the capacity of an information storage medium. In such a method, the area for recording updated data is not limited to the spare area, and updated data can also be recorded in an unrecorded area of the user data area of the information storage medium and replacement information (defect entry information) can be prepared accordingly.

Generally, in an information storage system, a host is used to manage data in units of sectors (each sector having 2048 bytes) and a drive system is used to record data on and reproduce data from an information storage medium in units of one or more sectors (for example, 16 sectors, or 32 sectors). When data is desired to be recorded or logically overwritten not in an entire block in an already recorded area on an information storage medium, but in some sectors in the area, the drive system first reproduces data in a block including the sectors in which the host commands the drive system to record data in the already recorded area, replaces the data corresponding to the sectors of the command with the data of the command by the host, and then records the data. This process is referred to as a read-modify-write (RMW). If an information storage medium is a rewritable information storage medium, data is overwritten in an identical physical location in the RMW process. If an information storage medium is a write-once information storage medium, data is replaced by the LOW process.

If a defect occurs during the RMW process in the rewritable information storage medium, that is, during data reproduction or during data writing after the read and modification of data occurred, the defect data need to be replaced. Thus, in order to indicate the state of the block replaced by the RMW process in a rewritable information storage medium or a write-once information storage medium, a replacement (defect) entry is generated. At this time, the drive system generally manages this replacement state by using replacement information indicating a state in which the block address corresponding to the original location is replaced by the address of the block replacing the original location. However, due to the replacement information in units of blocks, data reproduction can require significantly more time.

FIGS. 1A and 1B are reference diagrams of an example data area on an information storage medium and an example replacement (defect) entry used to illustrate conventional time delay problems during data reproduction.

Specifically, FIG. 1A illustrates an example data area 110 on an information storage medium 100, including a spare area #1 112, a user data area 114 and a spare area #2 116. FIG. 1A shows a state in which in order to update file B with file B' (8 sectors) in a user data area 114 where file A (19 sectors), the file B (8 sectors) and file C (21 sectors) are contiguously recorded, a host sends a write command with the address at which the file B is recorded, and the drive system performs the RMV process and records part Ⓐ of the file A, part Ⓑ of the file B', and part Ⓒ of the file C in physical sector number PSN 48~PSN 63. Though the part that should be actually updated is the file B, data recording and data reproduction are performed by the drive system in units of blocks, and one block, i.e., the back part of the file A and the front part of the file C, is replaced.

FIG. 1B shows a replacement entry 120 in a replaced state. Referring to FIG. 1B, PSN 16 is stored in the original PSN 122 and PSN 48 is stored in the replacement PSN 124. As a result, a data block corresponding to PSN 16~PSN 31 is replaced by a data block corresponding to PSN 48~PSN 63.

In this state, if the host sends a read command in order to reproduce the file A recorded in logical sector number LSN 0~LSN 18, the drive system first identifies a replacement state from the replacement (defect) entry 120 in order to reproduced PSN 0~PSN 18. Then, the drive system reproduces the first block corresponding to PSN 0~PSN 15, and then reproduces individual sectors inside the next data block corresponding to PSN 16~PSN 18. At this time, the drive system learns from the replacement entry 120 that the data block corresponding to PSN 16~PSN 31 is replaced by PSN 48~PSN 63, reproduces the block corresponding to PSN 48~PSN 63 and transmits replacement sectors PSN 48~PSN 63 corresponding to PSN 16~PSN 18 to the host. Thus, PSN 16~PSN 18 of the file A are actually the sectors that are originally not needed to be replaced, and even though these sectors are replaced, the sectors in the original block and the replacement block are identical data. As a result, PSN 48~PSN 50 in the replacement block is not necessarily needed to be reproduced. However, since the drive system does not know this situation, the drive system will continue to reproduce data in the replacement block as requested by the host such that more time is necessarily required for data reproduction.

So far, data replacement by LOW in the context of a write-once information storage medium is described with reference to FIGS. 1A-1B. However, the same problem occurs in a rewritable information storage medium. If PSN 16~PSN 31 are regarded as a defect during a RMW process to update data B', the data B' is recorded in a spare area 112 or 116 as a substitute. Also at this time, if the host desires to reproduce file A, the drive system should reproduce the data from the replacement block in order to reproduce PSN 16~PSN 18. However, in this case since the data recorded in the replacement block corresponding to PSN 16~PSN 18 can be different from the data recorded in PSN 16~PSN 18 in the original block, such a difference can cause data errors and other problems. This is because if an error occurs during a read operation of the RMW process, the drive system cannot reproduce data recorded in PSN 16~PSN 31, and therefore updates data B' only in PSN 19~PSN 31 in response to a write command of the host, and fills padding data (00h) in the remaining area. Accordingly, there is a need for new techniques for use in a drive system in which data replacement by LOW is implemented in both a user data area and a spare data, or a drive system performing defect management to reduce, if not eliminate, the delay time during data reproduction, and thereby improving data reproduction performance.

SUMMARY OF THE INVENTION

Various aspects of the present invention advantageously provide an information storage medium for use in a drive system in which replacement by LOW is implemented both in a user data area and a spare area and in a drive system performing defect management, having short reproduction time and improved reproduction performance, and a recording and/or reproducing apparatus and a recording and/or reproducing method.

According to an aspect of the present invention, there is provided an information storage medium comprising a user data area for recording user data, and a spare area for replacing a defect occurring in the user data area, wherein a replacement recording block to replace an original recording block recorded in the user data area is recorded in the spare area or an unrecorded area of the user data area, and a replacement entry indicating that part of the replacement recording block is replaced is recorded on the medium.

The replacement entry may include: original address information indicating the address of a first sector of replacement sectors to be replaced in the original recording block; and replacement address information indicating the address of a last sector of replacing sectors in the replacement recording block.

The replacement entry may further include state information indicating that part of the replacement recording block is replaced.

The information storage medium may be a rewritable information storage medium that supports defect management by a drive system, or a write-once information storage medium that supports defect management by a drive system.

According to another aspect of the present invention, there is provided a recording apparatus comprising: a write/read unit for writing data on an information storage medium or recording data from the information storage medium in which a user data area for recording user data and a spare area for replacing a defect occurring in the user data area are disposed, and a replacement recording block to replace an original recording block recorded in the user data area is recorded in the spare area or an unrecorded area of the user data area; and a control unit for controlling the write/read unit to write on the information storage medium a replacement entry indicating that part of the replacement recording block is replaced.

According to still another aspect of the present invention, there is provided a reproducing apparatus comprising: a write/read unit for writing data on an information storage medium or reading data from the information storage medium in which a user data area for recording user data and a spare area for replacing a defect occurring in the user data area are disposed, and a replacement recording block to replace an original recording block recorded in the user data area is recorded in the spare area or an unrecorded area of the user data area; and a control unit for controlling the write/read unit to read from the information storage medium a replacement entry indicating that part of the replacement recording block is replaced, and to read the data part to be reproduced from the original recording block if a read-out replacement entry is confirmed that a part of data to be reproduced is other than an actually replacing part in the replacement recording block to read.

According to yet still another aspect of the present invention, there is provided a recording method comprising: recording data on an information storage medium in which a user data area for recording user data and a spare area for replacing a defect occurring in the user data area are disposed, and a replacement recording block to replace an original recording block recorded in the user data area is recorded in the spare area or an unrecorded area of the user data area; and recording a replacement entry indicating that part of the replacement recording block is replacement replaced on the information storage medium.

According to a further aspect of the present invention, there is provided a reproducing method including: writing data, from an information storage medium in which a user data area for recording user data and a spare area for replacing a defect occurring in the user data area are disposed, and a replacement recording block to replace an original recording block recorded in the user data area is recorded in the spare area or an unrecorded area of the user data area; and reading from the information storage medium a replacement entry indicating that part of the replacement recording block is replaced, and if a part of data to be reproduced is confirmed as other than an actually replacing part in the replacement recording block by referring to the replacement entry, reading from the original recording block the data part to be reproduced.

The present invention is more specifically described in the following paragraphs by reference to the drawings attached only by way of example.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the invention are limited only by the terms of the appended claims. The following represents brief descriptions of the drawings, wherein:

DETAILED DESCRIPTION OF THE EMBODIMENTS

The present invention is applicable for use with all types of memory or computer-readable media, recording and/or reproducing apparatuses or drive systems, and computer systems implemented methods described according to various embodiments of the present invention. However, for the sake of simplicity, discussions will concentrate mainly on exemplary use of an optical disc serving as either a rewritable or a write-once storage medium, although the scope of the present invention is not limited thereto.

Figure 2:
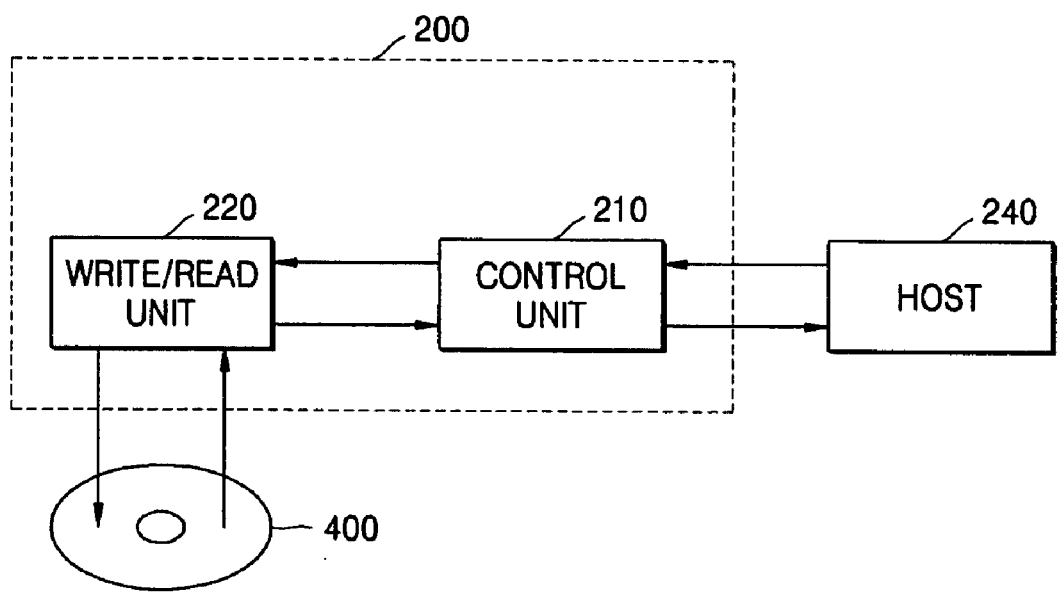
FIG. 2 is a schematic block diagram of an example recording and/or reproducing apparatus according to an embodiment of an embodiment of the present invention.

Turning now to FIG. 2, an example recording and/or reproducing apparatus 200 according to an embodiment of the present invention is illustrated. As show in FIG. 2, the recording and/or reproducing apparatus 200, i.e., a drive system, includes a write/read unit 220 and a control unit 210.

Under the control of the control unit 210, the write/read unit 220 records data on an optical disc 400 serving as an information storage medium, and reads data in order to reproduce the recorded data from the optical disc 400. The control unit 210 controls the write/read unit 220 so as to record data in units of a predetermined number of recording blocks, or obtains valid data by processing data read by the write/read unit 220.

When data is recorded, the control unit 210 controls the write/read unit 220 so that logical overwrite (LOW) is implemented and data is recorded according to a command of a host 240 or control of a drive system. LOW means that in order to update data recorded in a user data area of a write-once recording medium, update data, that is, the replacement data, is recorded in a spare area or an unrecorded area of a user data area, and the address information of original data and replacement data is managed so that the logical addresses seen by the host 240 do not change (this is performed by generating a replacement entry and recording the replacement entry on the optical disc 400). Thus, the control unit 210 performs data replacement recording in the spare area or the unrecorded area of the user data area by LOW.

Also, when data replacement recording is performed, if data to be replaced is not an entire block, but is only part of one block, the control unit 210 controls the write/read unit 220 so that replacement information indicating that replacement is performed partially is generated and recorded on the optical disc 400. Thus, by using the replacement information indicating that partial replacement is performed, when data is reproduced, a part in which replacement is not actually performed can be read from the original block, and not from the replacement block. As a result, the time delay during data reproduction can be advantageously minimized or prevented.

Figure 3:
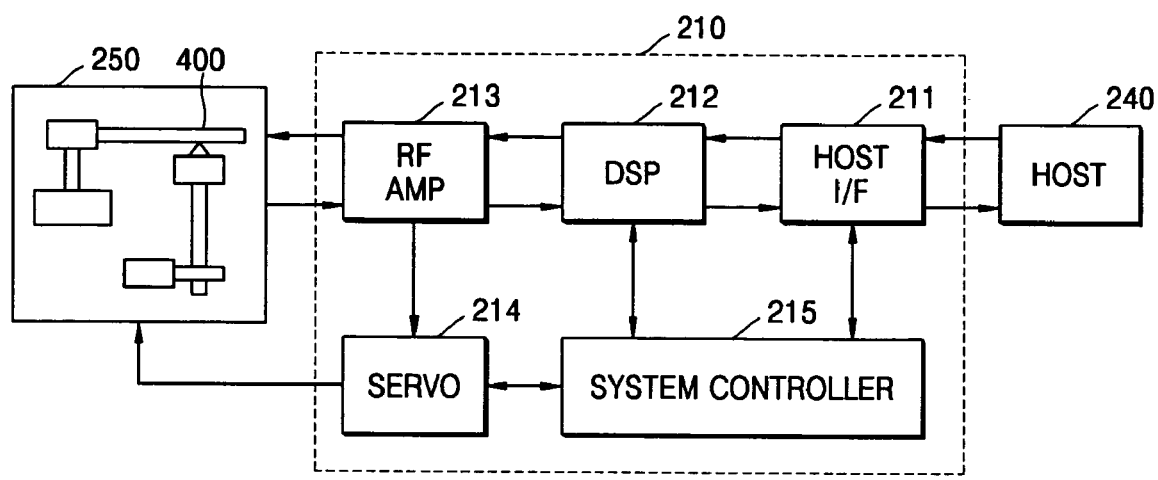
FIG. 3 is a detailed diagram of the recording and/or reproducing apparatus shown in FIG. 2.

FIG. 3 is a detailed diagram of an example recording and/or reproducing apparatus shown in FIG. 2.

Referring to FIG. 3, the control unit 210 and the write/read unit 220 can be implemented using several different components. For example, an optical pickup 250 may serve as the write/read unit 220 to perform read/write operations on an optical disc 400. In addition, a host I/F 211, a digital signal processor (DSP) 212, a radio-frequency amplifier (RF AMP) 213, a servo 214, and a system controller 215 may serve as the control unit 210.

When data is recorded, the host I/F 211 receives a write command together with data to be recorded and logical address information of the data, and transmits these information to the system controller 215.

The system controller 215 receives the write command from the host I/F 211 and performs initialization required for recording data. In particular, according to the present invention, when data is to be recorded in an already recorded area and not an entire block, but only part of one block is to be replaced, the system controller 215 operates so that replacement information indicating that partial replacement is performed is generated and recorded.

For this replacement information, according to an embodiment of the present invention, a partial replacement state information field is prepared in a replacement entry, and if this field is set, the replacement entry is managed as a partial replacement entry; otherwise, the replacement entry is managed as an ordinary replacement entry. That is, in case of the partial replacement entry, the original address indicates the address of the first sector of a part to be replaced in the original block, and the replacement address indicates the address of the last sector of a replacing part in the replacement block. In case of the ordinary replacement entry, the original address indicates the address of the first sector of the original block and the replacement address indicates the address of the first sector of the replacement block. Also, according to another embodiment of the present invention, the replacement information can be implemented without preparing the separate state information field in the replacement entry. That is, a sector address and not the conventional block unit address is employed as an address used in a replacement entry. Obviously, in this case the original address indicates the address of the first sector of a part to be replaced in the original block and the replacement address indicates the address of the last sector in a replacing part in the replacement block. Here, in case of replacing an entire block, the original address is the address of the first sector of the original block and the replacement address is the address of the last sector of a replacing block.

The DSP 212 attaches additional data, such as a parity, for error correction of the data to be recorded that is received from the host I/F 211, performs ECC encoding to generate an ECC block, that is, an error correction code block, and then modulates this ECC block in accordance with a predetermined method. The RF AMP 213 converts the data output from the DSP 212 into an RF signal. The pickup 250 records the RF signal output from the RF AMP 213 on the optical disc 400. The servo 214 receives an input command required for servo control from the system controller 215 and servo controls the optical pickup 250.

When data is reproduced, the I/F 211 receives a read command from the host 240. The system controller 215 performs initialization required for data reproduction. In particular, according to the present invention, the system controller 215 converts a logical address according to the read command into a physical address, and based on the converted physical address, examines a replacement entry. At this time, if a part of data to be reproduced is included in a replacement block but the part is different from than the actually replaced part, the system controller 215 operates so that the part is not read from the replacement block but is read directly from the original block. Since it is not needed to jump to the replacement block and read the part, a data reproduction time can be advantageously reduced and data reproduction performance can be improved.

The optical pickup 250 applies a laser beam on the optical disc 400, and outputs an optical signal obtained by receiving the laser beam reflected from the optical disc 400.

The RF AMP 213 converts the optical signal output from the optical pickup 250 into an RF signal and provides modulated data obtained from the RF signal to the DSP 212, while providing a servo signal obtained from the RF signals to the servo 214. The DSP 212 demodulates the modulated data, and outputs data obtained through ECC error correction.

Meanwhile, the servo 214 receives the servo signal from the RF AMP 213 and the command required for servo control from the system controller 215 and servo controls the optical pickup 250. The host I/F 211 transmits data received from the DSP 212 to the host 240.

Figure 4:
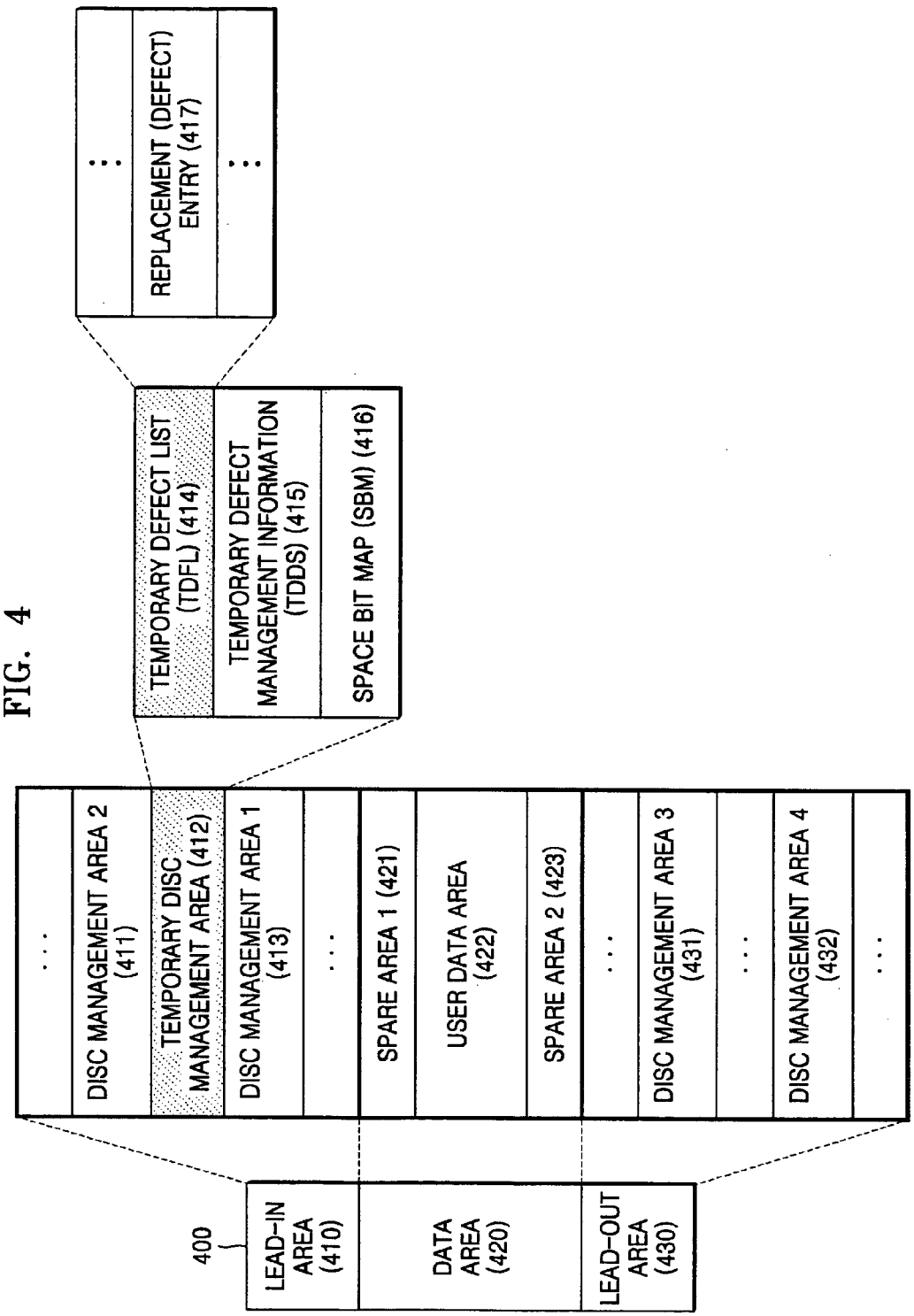
FIG. 4 is a diagram of the structure of an information storage medium according to an embodiment of the present invention.

FIG. 4 is a diagram of the structure of an optical disc serving as a write-one information storage medium according to an embodiment of the present invention.

Referring to FIG. 4, the structure of data recorded on the optical disc 400 serving as a write-once information storage medium includes a lead-in area 410, a data area 420, and a lead-out area 430.

The lead-in area 410 includes a disc management area (DMA #2) 411, a temporary disc management area (TDMA) 412, and a disc management area (DMA #1) 413. The DMA #2 411 and the DMA #1 413 are provided to record information regarding a defect occurring in the data area 420. In contrast, the lead-out area 430 includes a disc management area #3 431 and a disc management area #4 432 but not a temporary disc management area (TDMA).

The temporary disc management area (TDMA) 412 included in the lead-in area 410 is an area used for recording information for temporary defect management and temporary disc management.

This temporary disc management area 412 includes a temporary defect list (TDFL) 414, a temporary disc definition structure (TDDS) 415 and a space bit map (SBM) 416.

The temporary defect list (TDFL) 414 indicates information on a temporary defect, and includes location information of the defect data and location information of replacement data replacing this defect data. In particular, according to various embodiments of the present invention, the TDFL 414 includes a replacement (defect) entry 417 which indicates partial data replacement.

The data area 420 includes a spare area #1 421, a user data area 422, and a spare area #2 423. The user data area 422 is provided to record user data. The spare area #1 421 and the spare area #2 423 provide replacement blocks replacing defective blocks occurring in the user data area 422.

Figure 5A:
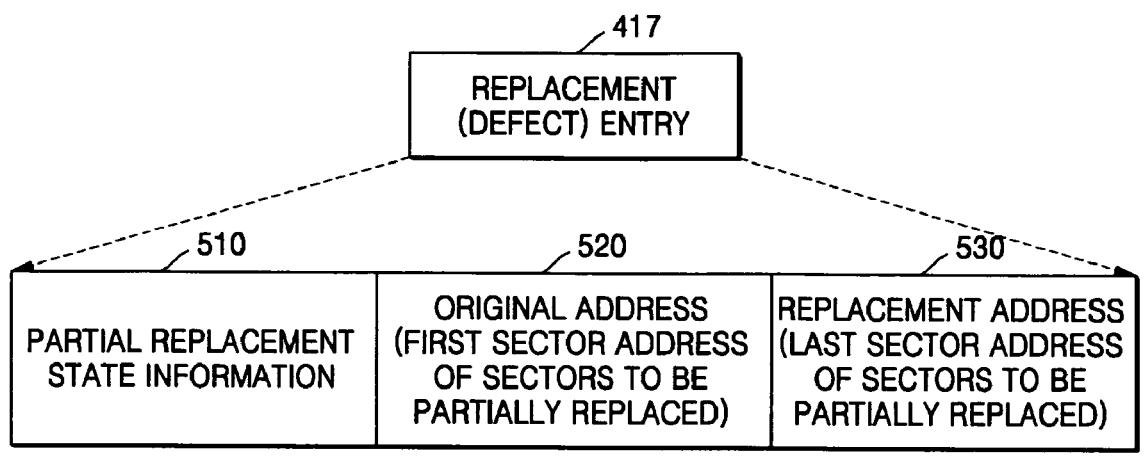
FIG. 5A illustrates an example of a replacement (defect) entry shown in FIG. 4.

FIG. 5A illustrates an example replacement (defect) entry shown in FIG. 4. Referring to FIG. 5A, the replacement entry 417 includes partial replacement state information 510, an original address 520, and a replacement address 530. In the example shown in FIG. 5A, a state information field is prepared, and if the state information field is not set to a value indicating a partial replacement state, the original address and replacement address identical to those in an ordinary replacement entry are considered. If the state information field is set to the value indicating a partial replacement state, the address field of the replacement (defect) entry 417 is considered differently.

The partial replacement state information 510 indicates that in the replacement entry only a part of one recording block is replaced. That is, if the partial replacement state information 510 is set, the original address 520 and the replacement address 530 are interpreted in the manner to be explained below. If the partial replacement state information 510 is not set, it is interpreted according to the ordinary method that the original address indicates the start PSN of the original recording block and the replacement address indicates the start PSN of the replacement recording block.

However, when the partial replacement state information is set, the original address 520 indicates the address of the first sector of the sectors to be replaced in the original recording block and the replacement address 530 indicates the address of the last sector of the partially replacing sectors in the replacement recording block. Thus, the replacement entry 417 indicating the partial state information shows how data is replaced.

Figure 5B:
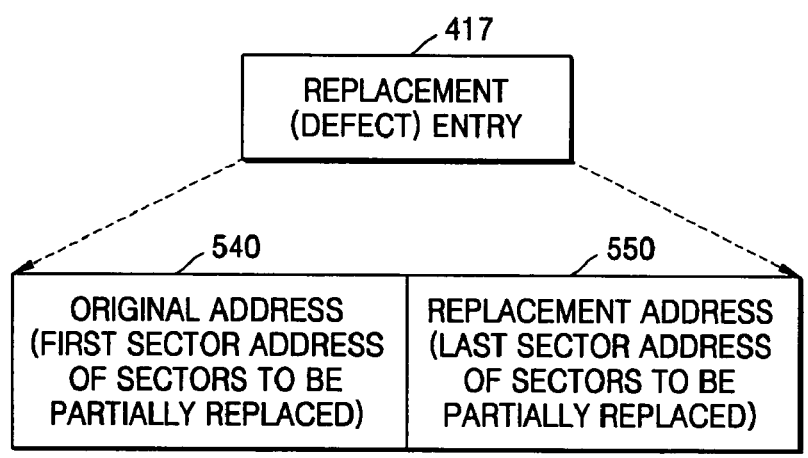
FIG. 5B illustrates another example of a replacement (defect) entry shown in FIG. 4.

FIG. 5B illustrates another example replacement (defect) entry shown in FIG. 4.

Referring to FIG. 5B, the replacement entry 417 includes an original address 540 and a replacement address 550. In the example shown in FIG. 5B, a separate state information field is not prepared and the original address indicates the address of the first sector of sectors to be partially replaced in the original recording block and the replacement address 550 indicates the address of the last sector of partially replacing sectors in the replacement recording block. In the example shown in FIG. 5A, replacement of an entire block and partial replacement are distinguished by the state information field, but in the example shown in FIG. 5B, for both partial replacement and entire block replacement, replacement information is expressed by a sector address. Accordingly, in the case of the example shown in FIG. 5B, replacement of an entire block can be expressed by the original address indicating the address of the first sector of the original recording block and the replacement address indicating the address of the last sector of the replacement recording block.

The temporary disc definition structure (TDDS) 415 includes location pointers of the temporary defect list (TDFL), and SBM. In the temporary disc definition structure (TDDS) 415, information on the location and size of the spare area allocated during the initialization, write protection information, information on the location and size of a temporary defect management area allocated in the data area, information on a location replaceable in each spare area, and information on the last recording address of the user data area are recorded.

The space bit map (SBM) 416 included in the temporary disc management area 412, as shown in FIG. 4, is a map indicating whether or not data is recorded in a user data area 422, and expressing by a bit value whether or not data is recorded in each cluster of the user data area 422. The space bit map (SBM) 416 is used when the user data area 422 is used in a random recording mode, and when the user data area 422 is used in a sequential recording mode, recording management information indicating the recording state of data as entry information is used.

The disc management area #1 413, the disc management area #2 411, the disc management area #3 431, and the disc management area #4 432 are areas for recording final temporary disc management information when the write-once recording medium is finalized.

In the data area 420, a spare area #1 421, a user data area 422, and a spare area #2 423 are continuously disposed.

The spare area #1 421 and the spare area #2 423 are areas for recording replacement data replacing data recorded in the user data area 422. In these spare areas 421 and 423, replacement data by a defect can be recorded, and replacement data by LOW can also be recorded.

The user data area 422 is an area for recording user data. In particular, according to the present invention, replacement data replacing user data by LOW is recorded not only in the spare area but also in this user data.

Figure 1A:
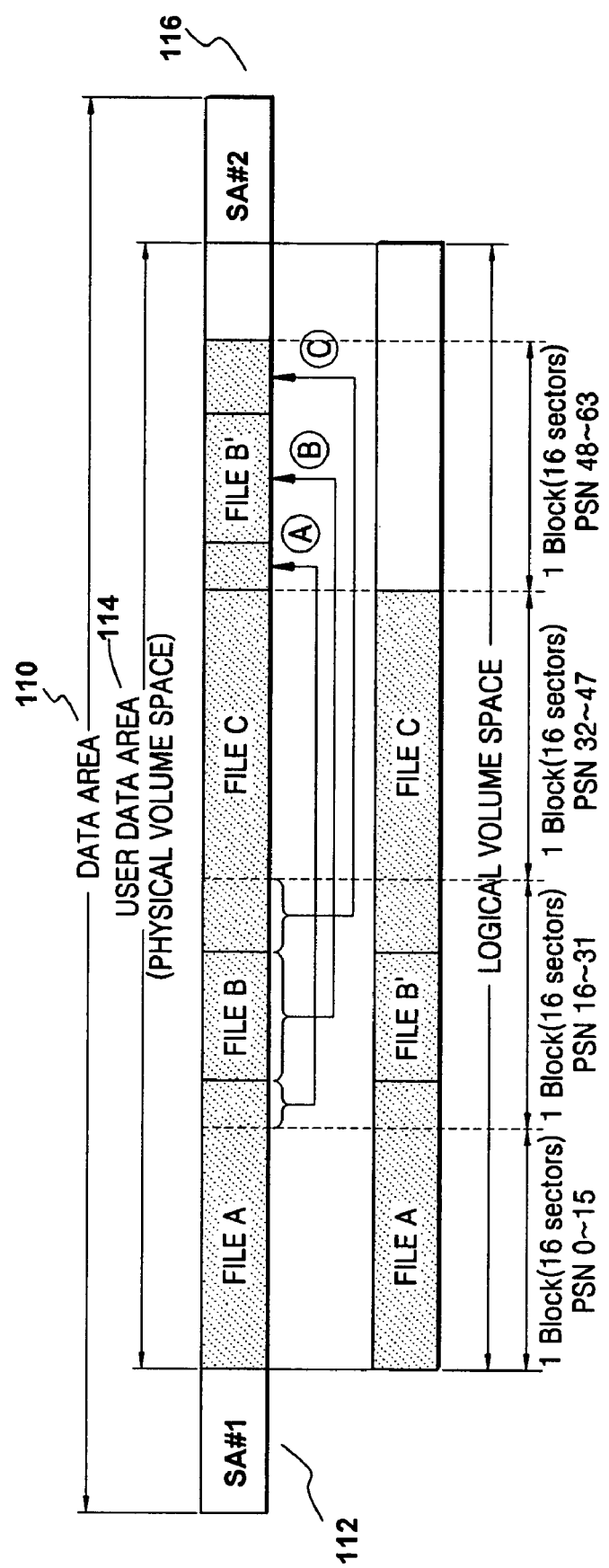
FIGS. 1A and 1B are reference diagrams of an example data area on an information storage medium and an example replacement (defect) entry used to illustrate conventional time delay problems during data reproduction.
Figure 1B:
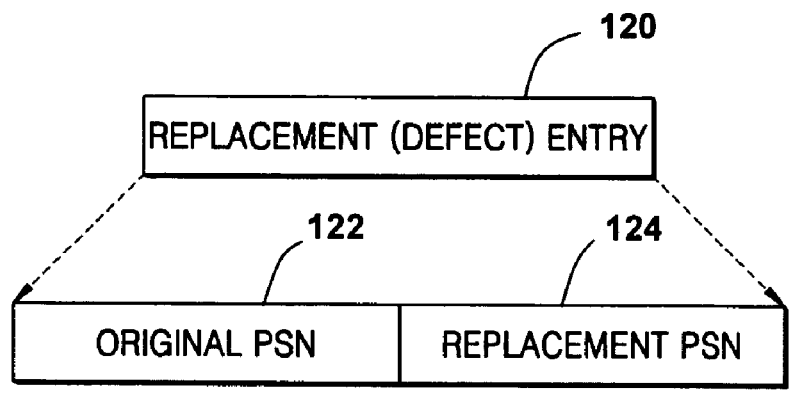
Figure 6A:
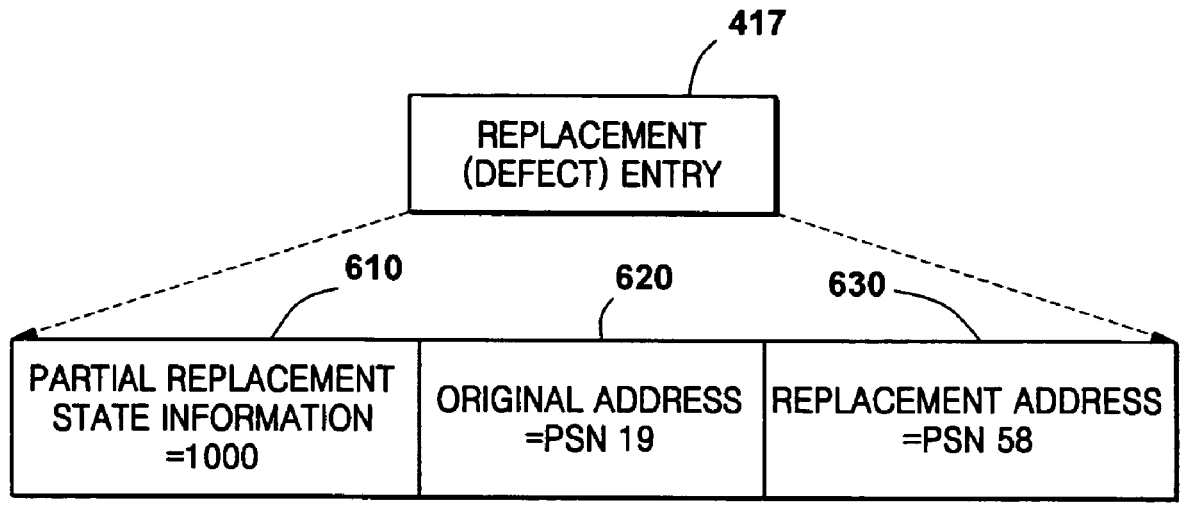
FIG. 6A illustrates an example of a replacement entry according to an embodiment of the present invention in the situation shown in FIG. 1A.

FIG. 6A illustrates an example of a replacement entry according to an embodiment of the present invention in the situation shown in FIG. 1A. That is, the replacement entry shown in FIG. 6A is an example in which a state information field is prepared.

In the situation shown in FIG. 1A, formal replacement is performed in units of blocks. Accordingly, such data replacement is performed seemlessly as if the original recording block from PSN 16 through PSN 31 is replaced by the replacement recording block from PSN 48 through PSN 63. However, the part of which data is actually replaced is PSN 19 through PSN 26 in which the file B is recorded, and PSN 16 through PSN 18 and PSN 27 through PSN 31 of the original recording block are not updated parts.

Accordingly, in this case, if the replacement entry as shown in FIG. 6A is generated, only the part in which replacement is performed can be expressed.

Referring to FIG. 6A, by expressing the partial replacement state information of the replacement entry as "1000", it can be indicated that, in this replacement entry 417, not the entire block but only a part of the block is to be replaced. Obviously, the value indicating the partial replacement state information can also be expressed by a value other than "1000". Also, as the original address of the replacement entry 417, the PSN corresponding to the first sector of the sectors to be partially replaced in the original recording block, that is, PSN 19 is recorded. As the replacement address, the PSN corresponding to the last sector of the sectors partially replacing in the replacement recording block, that is, PSN 58 is recorded.

Figure 6B:
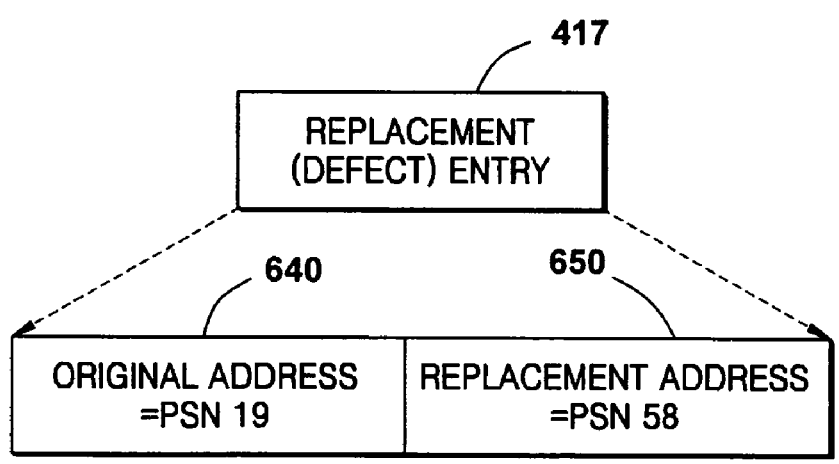
FIG. 6B illustrates another example of a replacement entry according to an embodiment of the present invention in the situation shown in FIG. 1A.

FIG. 6B illustrates another example of a replacement entry according to an embodiment of the present invention in the situation shown in FIG. 1A. In the example shown in FIG. 6B, partial replacement is not expressed by using the state information field, and a sector address is used for the management of replacement information itself.

Referring to FIG. 6B, the PSN corresponding to the first sector of the sectors to be partially replaced in the original recording block, that is, PSN 19, is recorded as the original address of the replacement entry. The PSN corresponding to the last sector of the sectors partially replacing in the replacement recording block, that is, PSN 58, is recorded as the replacement address.

Figure 6C:
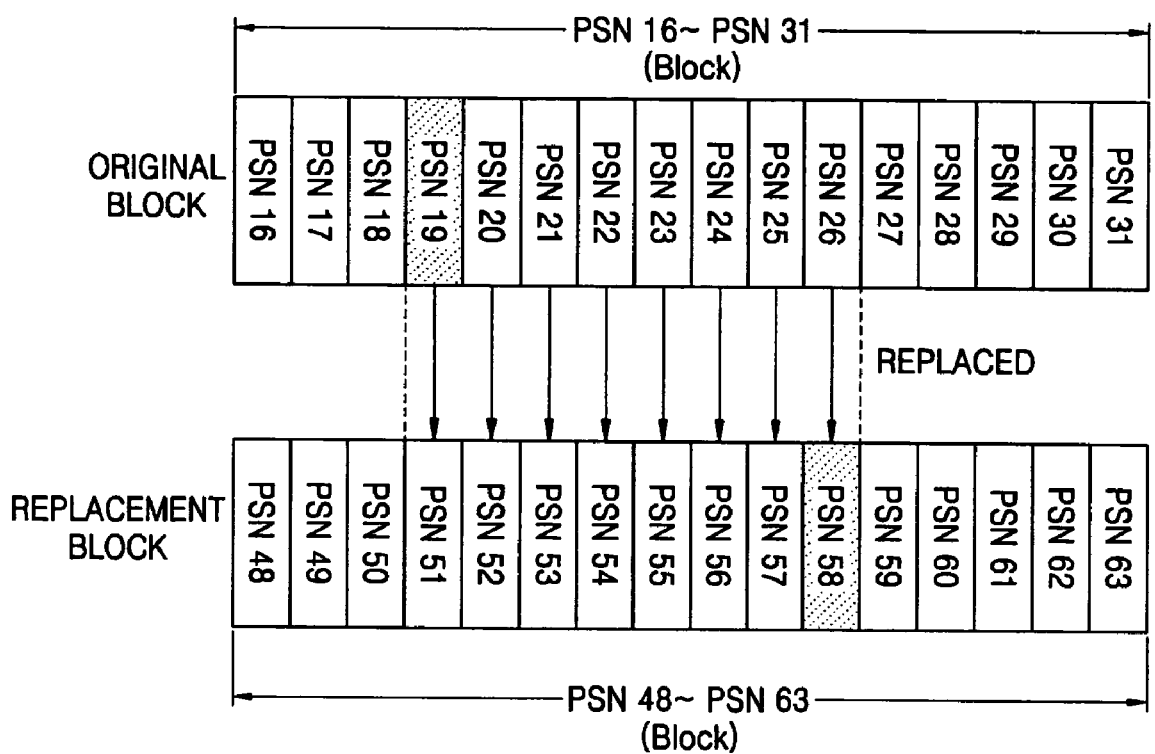
FIG. 6C is a reference diagram for explaining an interpretation method of the replacement entries shown in FIGS. 6A and 6B.

FIG. 6C shows an interpretation method of the replacement entries shown in FIGS. 6A and 6B.

Referring to FIG. 6C, one block is formed with a predetermined number of sectors, and the position of the sector in the block can be learned from a physical sector number (PSN). That is, the original address indicates the start sector from which replacement begins in the original block and the replacement address indicates the last sector which replacement ends in the replacement block.

Thus, a partial replacement state is expressed in the replacement entry 417, and after that, if the host 240, as shown in FIGS. 2 and 3, wants to reproduce the file A and sends a reproduction command to reproduce LSN 0~LSN 18, the drive system knows from the partial replacement state information of this replacement entry that PSN 16~PSN 18 corresponding to LSN 0~LSN 18 are not replaced and can directly reproduce two blocks corresponding to PSN 0~PSN 31 and transmit the file A stored in PSN 0~PSN 18 to the host 240. Accordingly, the time delay during data reproduction can be prevented.

Figure 7:
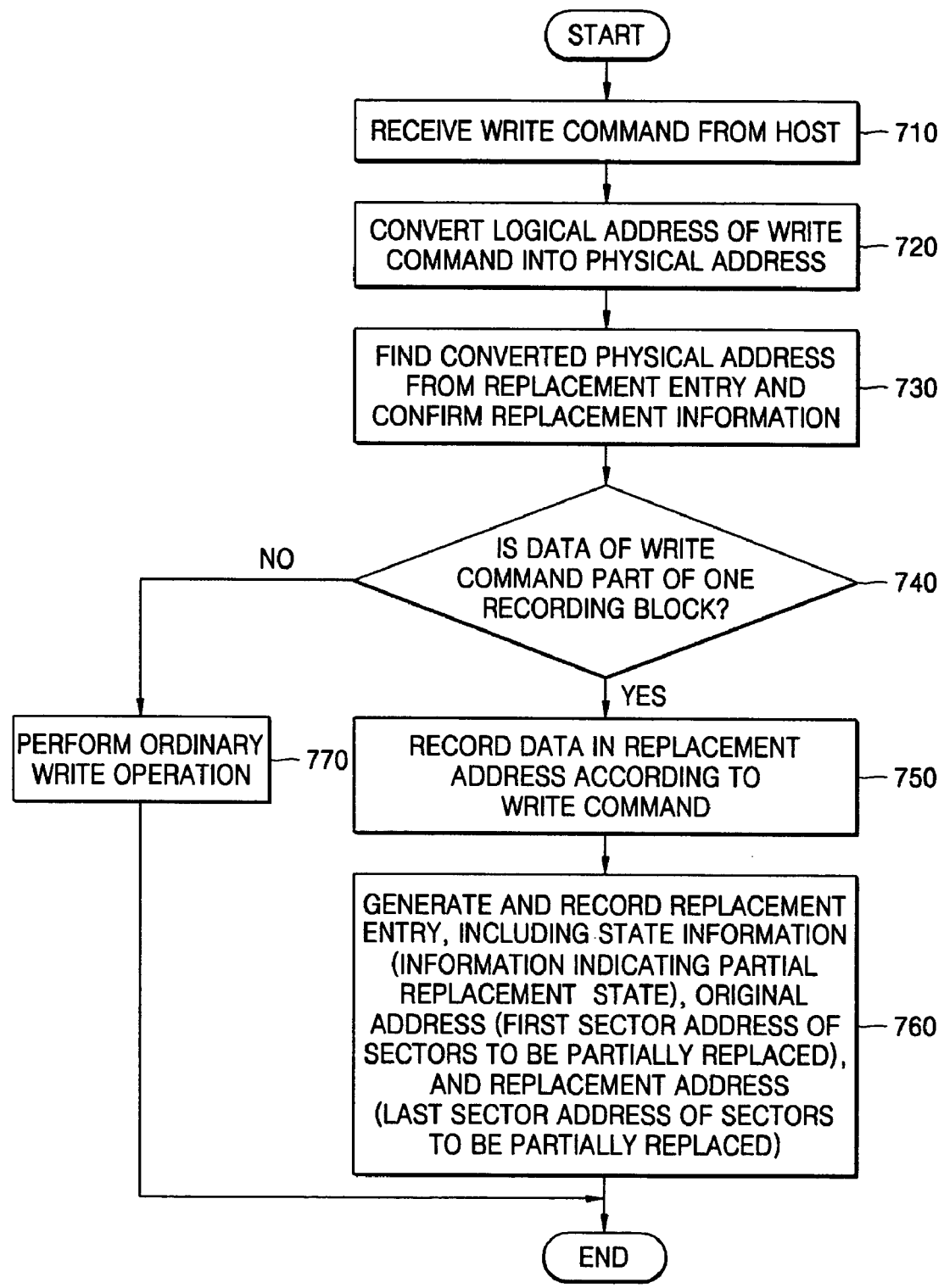
FIG. 7 is a flowchart of a process for recording data according to an embodiment of the present invention.

FIG. 7 is a flowchart of the operations performed by a process for recording data according to an embodiment of the present invention.

Referring to FIG. 7, a drive system 200 receives a write command from a host 240, as shown, for example, in FIGS. 2 and 3, in operation 710. The host 240 transmits data to be written, a logical address of data to be written together with the write command to the drive system 200. First, the drive system 200 converts the logical address of the write command into a physical address in operation 720.

The drive system 200 finds the converted physical address in a replacement entry 417, as shown, for example, in FIGS. 5A-5B and FIGS. 6A-6B, and confirms the replacement information in operation 730.

Then, whether or not the data of the write command is part of one recording block is confirmed in operation 740, and if it is one recording block, an ordinary write operation is performed in operation 770. The ordinary write operation means that the data according to the write command is recorded in a replacement address, and a replacement entry having the address of the start sector of the original block as the original address and the address of the start sector of the replacement block as the replacement address is generated and recorded.

If the data according to the write command is a part of one recording block, the data according to the write command is recorded in a replacement address in operation 750. In this case, whether, except the part that is actually to be updated in the replacement block to be recorded in the replacement address, the remaining part of the replacement block is to be padded with meaningless data values or with the data part included in the original block without change can be determined according to a drive system policy.

Next, the drive system 200 generates a partial replacement entry indicating that partial replacement is performed, and records this in the temporary defect management area (TDFL) 414, as shown in FIG. 4, in operation 760. The partial replacement entry includes state information indicating the partial replacement state, the original address indicating the address of the first sector of sectors to be replaced, and the replacement address indicating the address of the last sector of replacing sectors.

In the flowchart described above, the write operation using the replacement entry having the state information field as shown in FIG. 5A is explained. When the replacement entry 417 without the state information field as shown in FIG. 5B is used, the drive system 200 considers the original address of the replacement entry 417 as the address of the first sector of replacement sectors to be replaced in the original block and the replacement address as the address of the last sector of replacement sectors in the replacement block whether the replacement is of an entire block or of a part of a block.

Figure 8:
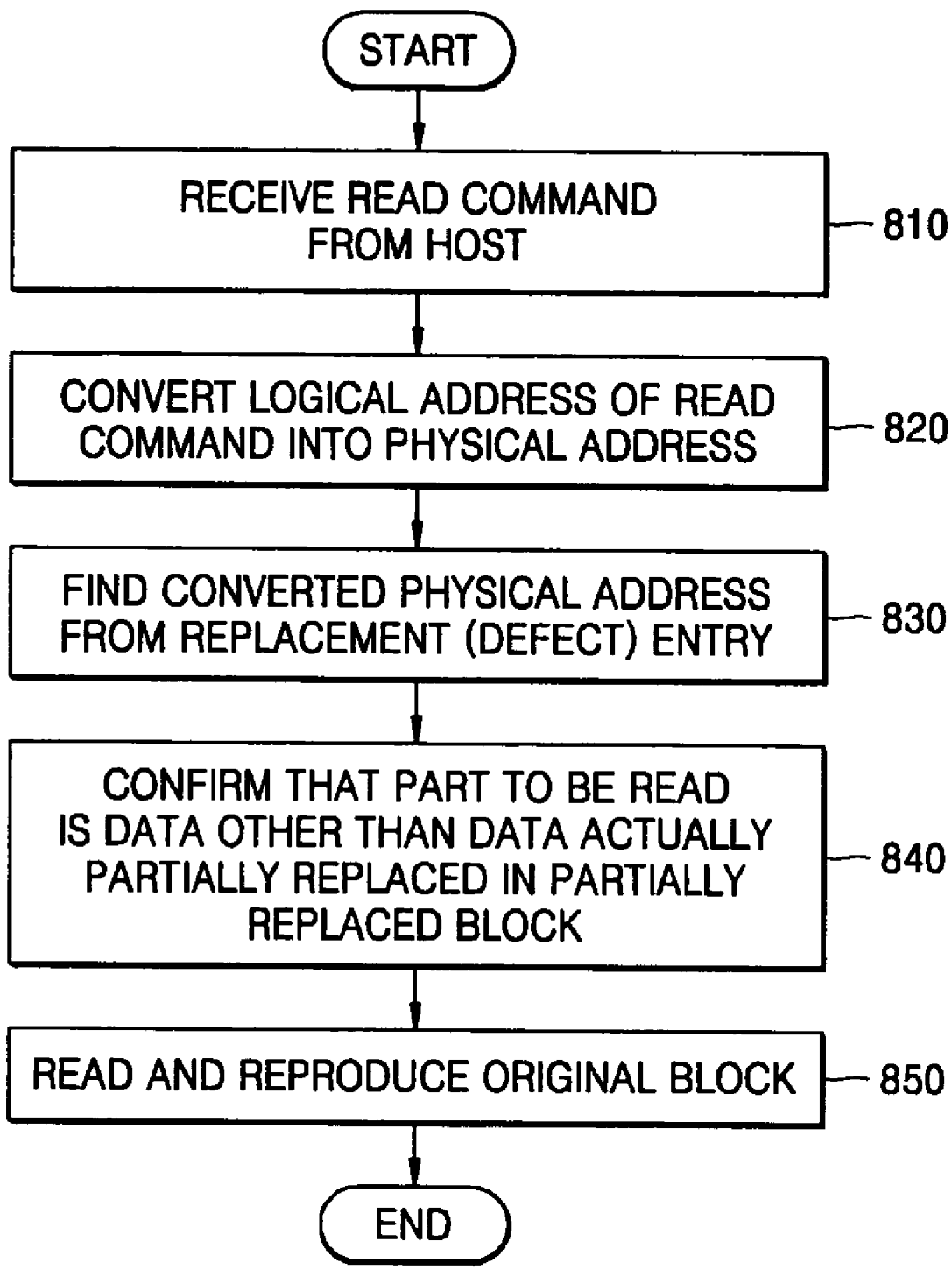
FIG. 8 is a flowchart of a process for reproducing data according to an embodiment of the present invention.

FIG. 8 is a flowchart of the operations of a process for reproducing data according to an embodiment of the present invention.

As shown in FIG. 8, a drive system 200 receives a data read command from a host 240 in operation 810. The host 240 transmits a logical address of data to be read together with the read command to the drive system 200.

Then, the drive system 200 converts the logical address of the read command of the host 240 into a physical address in operation 820. Then, the converted physical address is found in a replacement (defect) entry 417 in operation 830.

If it is confirmed that the part to be reproduced is other than the part that is actually partially replaced in the partially replacing block in operation 840, the original block is read and reproduced in operation 850. That is, the replacement entry 417 according to an embodiment of the present invention represents a more detailed address of a block unit, that is, represents replacement in units of sectors. Accordingly, even though a sector to be reproduced is included in a replacement block, it can be confirmed whether or not the sector is an actually replacing sector, and if the confirmation result indicates that the sector is not an actually replacing sector, the data of the sector is read from the original block and reproduced. Obviously, if the sector to be reproduced is included in the replacement block and the sector is an actually replacing sector, the data of the sector should be read from the replacement sector and reproduced.

As described from the foregoing, the present invention advantageously provides new techniques for data replacement in a recording and/or reproducing apparatus (i.e., drive system) using a temporary defect list (TDFL) in a temporary disc management area on an information storage medium so as to reduce, if not eliminate, the delay time during data reproduction, and thereby improving data reproduction performance.

Though the replacement of original data by LOW in the write-once recording medium is explained in the example described above, the present invention is not limited to the write-once recording medium, and can also be applied to the replacement of an original block due to a defect in a rewritable information storage medium in the same manner.

The present invention can also be embodied as computer readable codes on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While there have been illustrated and described what are considered to be example embodiments of the present invention, it will be understood by those of ordinary skill in the art and as technology develops that various changes in form and modification may be made therein, and equivalents may be substituted for element thereof without departing from the spirit and scope of the present invention. For example, other computer readable media such as read-only memory (ROM), random-access memory (RAM), CD-ROMs, magnetic tapes, floppy disks, optical or data storage devices, and carrier waves, as described above, may be utilized as long as the data replacement techniques as described in connection with FIG. 4, FIGS. 5A-5B, FIGS. 6A-6C, FIG. 7 and FIG. 8 are utilized. Likewise, a central controller can be implemented as a chipset, or alternatively, a general or special purposed computer programmed to perform the methods as described with reference to FIG. 7 and FIG. 8. Accordingly, it is intended, therefore, that that present invention not be limited to the various example embodiments disclosed, but that the present invention includes all embodiments falling within the scope of the appended claims.

What is claimed is:

1. An information storage medium comprising:
   a user data area for recording user data; and
   a spare area for replacing a defect occurring in the user data area; wherein:
   a replacement recording block to replace an original recording block recorded in the user data area is recorded in one of the spare area and an unrecorded area of the user data area, and
   a replacement entry comprising state information indicating that part, but not all, of the original recording block is replaced by the replacement recording block is recorded on the medium.

2. The information storage medium as claimed in claim 1, wherein the replacement entry further comprises:
   original address information indicating the address of a first sector of replacement sectors to be replaced in the original recording block; and
   replacement address information indicating the address of a last sector of replacement sectors in the replacement recording block.

3. The information storage medium as claimed in claim 1, wherein the information storage medium is a rewritable information storage medium that supports defect management by a drive system.

4. The information storage medium as claimed in claim 1, wherein the information storage medium is a write-once information storage medium that supports defect management by a drive system.

5. A recording apparatus comprising:
   a write/read unit arranged to write data on an information storage medium or to read data from the information storage medium in which a user data area for recording user data and a spare area for replacing a defect occurring in the user data area are disposed, and a replacement recording block to replace an original recording block recorded in the user data area is recorded in the spare area or an unrecorded area of the user data area; and
   a control unit configured to control the write/read unit so as to write on the information storage medium, a replacement entry comprising state information indicating that part, but not all, of the original recording block is replaced by the replacement recording block.

6. The apparatus as claimed in claim 5, wherein the replacement entry further comprises:
   original address information indicating the address of a first sector of replacement sectors to be replaced in the original recording block; and
   replacement address information indicating the address of a last sector of replacement sectors in the replacement recording block.

7. The apparatus as claimed in claim 5, wherein the information storage medium is a rewritable information storage medium that supports defect management by a drive system.

8. The apparatus as claimed in claim 5, wherein the information storage medium is a write-once information storage medium that supports defect management by a drive system.

9. A reproducing apparatus comprising:
a write/read unit arranged to write data on an information storage medium or to read data from the information storage medium in which a user data area for recording user data and a spare area for replacing a defect occurring in the user data area are disposed, and a replacement recording block to replace an original recording block recorded in the user data area is recorded in the spare area or an unrecorded area of the user data area; and
a control unit configured to control the write/read unit so as to read from the information storage medium a replacement entry comprising state information indicating that part of the original recording block is replaced by the replacement recording block, and to read a data part to be reproduced from the original recording block based on the replacement entry when a read-out replacement entry is confirmed that a part of data to be reproduced is other than an actually replaced part in the replacement recording block.

10. The apparatus as claimed in claim 9, wherein the replacement entry further comprises:
original address information indicating the address of a first sector of replacement sectors to be replaced in the original recording block; and
replacement address information indicating the address of a last sector of replacement sectors in the replacement recording block.

11. The apparatus as claimed in claim 9, wherein the information storage medium is a rewritable information storage medium that supports defect management by a drive system.

12. The apparatus as claimed in claim 9, wherein the information storage medium is a write-once information storage medium that supports defect management by a drive system.

13. A recording method comprising:
recording data on an information storage medium in which a user data area for recording user data and a spare area for replacing a defect occurring in the user data area are disposed, and a replacement recording block to replace an original recording block recorded in the user data area is recorded in the spare area or an unrecorded area of the user data area; and
recording a replacement entry comprising state information indicating that part, but not all of the original recording block is replaced by the replacement recording block on the information storage medium.

14. The method as claimed in claim 13, wherein the replacement entry further comprises:
original address information indicating the address of a first sector of replacement sectors to be replaced in the original recording block; and
replacement address information indicating the address of a last sector of replacement sectors in the replacement recording block.

15. A reproducing method comprising:
reading data from an information storage medium in which a user data area for recording user data and a spare area for replacing a defect occurring in the user data area are disposed, and a replacement recording block to replace an original recording block recorded in the user data area is recorded in the spare area or an unrecorded area of the user data area; and
reading from the medium a replacement entry comprising state information indicating that part of the original recording block is replaced by the replacement recording block, and when a read-out replacement entry is confirmed that a part of data to be reproduced is other than an actually replaced part in the replacement recording block, reading from the original recording block the data part to be reproduced.

16. The method as claimed in claim 15, wherein the replacement entry further comprises:
original address information indicating the address of the first sector of sectors to be replaced in the original recording block; and
replacement address information indicating the address of the last sector of replacing sectors in the replacement recording block.

17. An information storage medium comprising:
a data area including a user data area for recording user data, and a spare area for replacing a defect occurring in the user data area; and
a defect management area for managing a defect occurring in the user data area,
wherein a replacement recording block to replace an original recording block recorded in the user data area is recorded in one of the spare area and an unrecorded area of the user data area, and
a replacement entry comprising state information indicating that part, but not all of the original recording block is replaced by the replacement recording block is recorded in the defect management area.

18. The information storage medium as claimed in claim 17, wherein the replacement entry further comprises:
original address information indicating the address of a first sector of replacement sectors to be replaced in the original recording block; and
replacement address information indicating the address of a last sector of replacement sectors in the replacement recording block.

19. The information storage medium as claimed in claim 17, wherein the information storage medium is one of a rewritable information storage medium and a write-once information storage medium that supports defect management by a drive system.

* * * * *